United States Patent
Oogami

(10) Patent No.: US 8,717,477 B2
(45) Date of Patent: May 6, 2014

(54) IMAGING APPARATUS SWITCHING BETWEEN DISPLAY OF IMAGE AND ENLARGED IMAGE OF FOCUS AREA

(75) Inventor: Tomohiro Oogami, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/434,067

(22) Filed: Mar. 29, 2012

(65) Prior Publication Data

US 2012/0274825 A1 Nov. 1, 2012

(30) Foreign Application Priority Data

Mar. 30, 2011 (JP) .................................. 2011-075048

(51) Int. Cl.
- H04N 5/222 (2006.01)
- H04N 5/225 (2006.01)
- G03B 13/00 (2006.01)

(52) U.S. Cl.
USPC ................. 348/333.01; 348/333.11; 348/346; 348/353

(58) Field of Classification Search
USPC .......................... 348/333.01, 333.11, 346, 353
See application file for complete search history.

(56) References Cited

U.S. PATENT DOCUMENTS

| | | | |
|---|---|---|---|
| 2009/0185063 A1* | 7/2009 | Aoyama | 348/333.01 |
| 2009/0185064 A1* | 7/2009 | Maniwa | 348/333.11 |
| 2010/0149402 A1* | 6/2010 | Aoki et al. | 348/333.12 |
| 2010/0289937 A1* | 11/2010 | Hada | 348/333.01 |

FOREIGN PATENT DOCUMENTS

| | | |
|---|---|---|
| JP | 2001-251540 | 9/2001 |
| JP | 2004-347977 | 12/2004 |
| JP | 2009-118515 | 5/2009 |

* cited by examiner

Primary Examiner — Twyler Haskins
Assistant Examiner — Padma Haliyur
(74) Attorney, Agent, or Firm — Panasonic Patent Center

(57) ABSTRACT

An imaging apparatus includes a display unit configured to display an image based on the image information output from the imaging unit, and a controller configured to control a display operation of the display unit. When the operation section receives the instruction to perform the focus operation while the display unit is displaying an image, the controller controls the display unit to switch the display on the display unit from an image currently displayed to an enlarged image of a focus area in the image currently displayed. When a predetermined condition is satisfied after completion of the focus operation, the controller further controls the display unit to switch the display on the display unit from the enlarged image to an image with the same angle of view as that of the image displayed before the enlarged image.

3 Claims, 5 Drawing Sheets

A THROUGH IMAGE WITH AN NORMAL ANGLE OF VIEW

301

A THROUGH IMAGE WITH AN ENLARGED ANGLE OF VIEW

A THROUGH IMAGE WITH AN NORMAL ANGLE OF VIEW

301

A THROUGH IMAGE WITH AN ENLARGED ANGLE OF VIEW

IMAGING APPARATUS SWITCHING BETWEEN DISPLAY OF IMAGE AND ENLARGED IMAGE OF FOCUS AREA

BACKGROUND

1. Technical Field

The technical field relates to an imaging apparatus and more particularly to an imaging apparatus which performs autofocus control.

2. Related Art

There is known a technique for displaying an enlarged image of a subject to be in focus on a display unit for a user to confirm whether the subject intended to be in focus is brought into focus or not. For example, the camera disclosed in JP 2009-118515 A cuts a predetermined partial image out from the entire photographed image according to a manual focus operation and displays the image signal representing the cut out partial image on a display unit.

Generally, a user using a camera as disclosed in JP 2009-118515 A checks the focusing state of a subject to be in focus to evaluate the present focus position. Therefore, such a camera is expected that facilitates the user's check on the focus state of the subject to be in focus.

The camera disclosed in JP 2009-118515 A keeps displaying an enlarged image on a display unit for the user to check the focus state. Therefore, the user has to take a photograph without being able to confirm a composition (angle of view) of the image immediately before the actual photographing operation, which is inconvenience for the user.

SUMMARY

In view of the above problems, an imaging apparatus is provided, which allows a user to more reliably confirm focusing state of the subject to be in focus and a composition of the image to be photographed.

In one aspect, an imaging apparatus is provided which includes an imaging unit configured to capture an image of a subject to output image information, an operation section configured to receive a user's instruction to perform a focus operation, a display unit configured to display an image based on the image information output from the imaging unit, and a controller configured to control a display operation of the display unit. When the operation section receives the instruction to perform the focus operation while the display unit is displaying an image, the controller controls the display unit to switch the display on the display unit from an image currently displayed to an enlarged image of a focus area in the image currently displayed. When a predetermined condition is satisfied after completion of the focus operation, the controller further controls the display unit to switch the display on the display unit from the enlarged image to an image with the same angle of view as that of the image displayed before the enlarged image.

The imaging apparatus of the aspect first switches the display on the display unit from the currently displayed image to an enlarged image upon receipt of the instruction to perform the focus operation. Then when a predetermined condition is satisfied after the completion of the focus operation, the imaging apparatus switches the display on the display unit from the enlarged image to an image with the same angle of view as that of the image displayed before the enlarged image. With the above operations, the user can confirm both the focus state and the angle of view of the image to be photographed, improving the convenience of the imaging apparatus.

DETAILED DESCRIPTION OF PREFERRED EMBODIMENTS

Embodiments will be described below with reference to the attached drawings.

First Embodiment

An embodiment using a digital camera will be described. The digital camera of the present embodiment starts an autofocus operation (hereinafter, referred to as an "AF operation") in response to a user's half-press operation on a release button or a user's pressing on a button for instructing start of autofocus operation (hereinafter, referred to as an "AF start button"). Simultaneously with starting of the AF operation, the controller controls a CCD image sensor to switch the display to a through image which has an enlarged angle of view of an area in the vicinity of a focus frame. The AF operation is performed based on a contrast value of the through image with the enlarged angle of view of the area in the vicinity of the focus frame. The through image with the enlarged angle of view of the area in the vicinity of the focus frame is displayed for a certain period of time after the completion of the AF operation. This through image is switched to a through image with the original angle of view, when the certain period of time elapses.

The "focus frame" is a frame indicating a partial area of image data captured and generated by a CCD image sensor 120, which is referenced by a digital camera 100 for focusing. The "through image" is generated by the CCD image sensor 120 for every certain period of time and displayed for a user to confirm the angle of view and the exposure setting without being stored in the digital camera 100. The configuration and the operations of the digital camera 100 will be described in detail below.

1-1. Configuration

Figure 1:
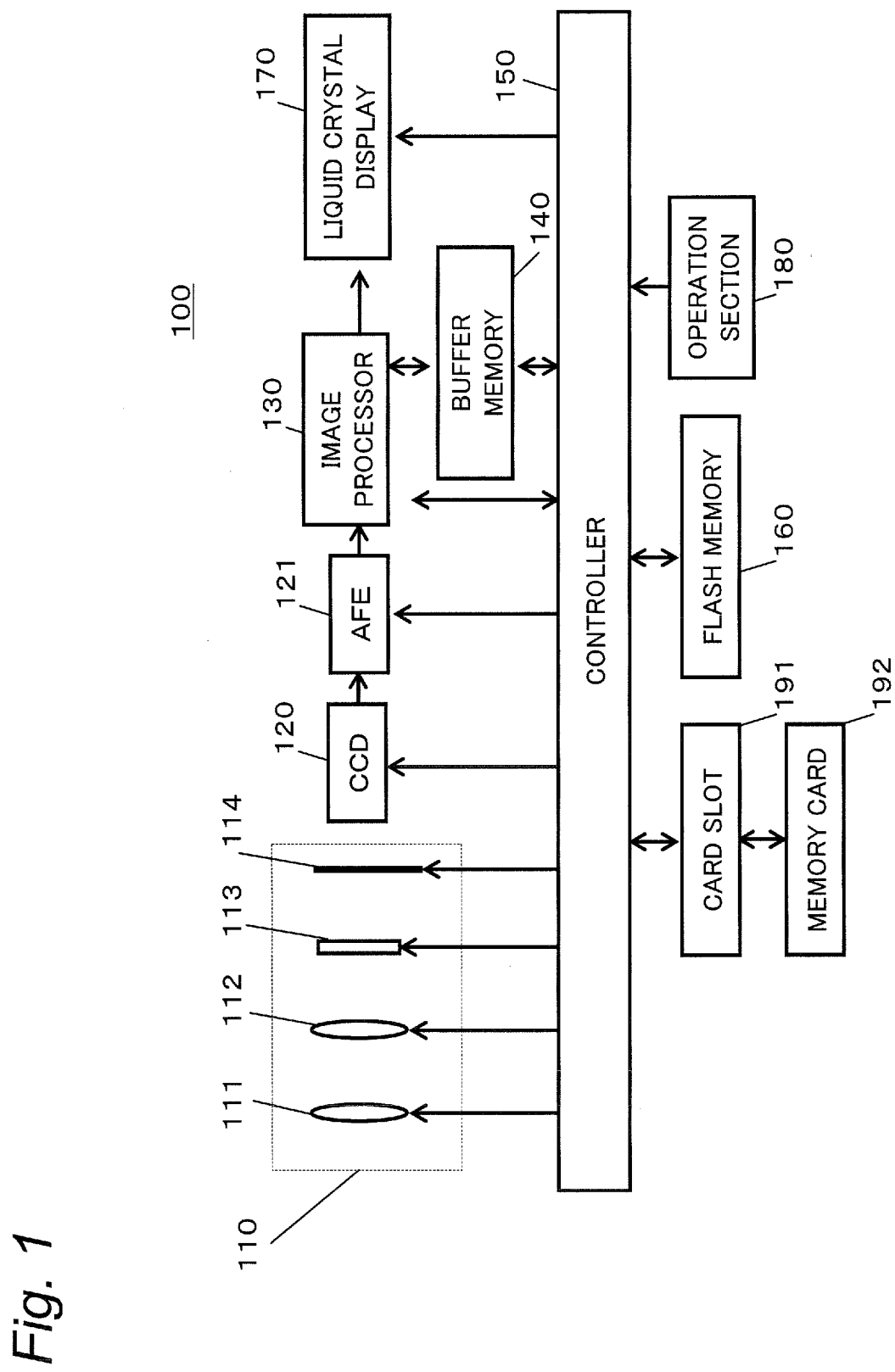
FIG. 1 is a block diagram of a digital camera.

The configuration of the digital camera 100 will be described with reference to FIG. 1. The digital camera 100 of the present embodiment includes an optical system 110, a CCD image sensor 120, an AFE (Analog Front End) 121, an image processor 130, a buffer memory 140, a controller 150, a flash memory 160, a liquid crystal display 170, an operation section 180, a card slot 191, and a memory card 192.

The digital camera 100 captures a subject's image formed through the optical system 110 by the CCD image sensor 120. The CCD image sensor 120 generates image data based on the captured subject's image. The image data generated by the CCD image sensor 120 is subjected to various types of image processing in the AFE 121 and the image processor 130. The image data is stored in the flash memory 160 or the memory card 192. The image data stored in the flash memory 160 or the memory card 192 can be reproduced and displayed on the liquid crystal display 170 when the user's operation on the operation section 180 is received. The image data captured by the CCD image sensor 120 and then output from the image processor 130 is displayed on the liquid crystal display 170 as a through image.

The optical system 110 includes a focus lens 111, a zoom lens 112, a diaphragm 113, and a shutter 114. Although not shown in the figure, the optical system 110 may include an optical camera shake correction lens OIS (Optical Image Stabilizer). The optical system 110 may include any number of various lenses or any number of lens groups. The optical system 110 may be interchangeable in the form of interchangeable lens, and in this case, the optical system 110 includes the focus lens 111, the zoom lens 112, and the diaphragm 113.

The focus lens 111 adjusts a focal distance. The zoom lens 112 adjusts a zoom magnification of an image formed on the CCD image sensor 120. The diaphragm 113 adjusts the amount of light incident to the CCD image sensor 120. The shutter 114 adjusts the exposure time of light incident to the CCD image sensor 120. The focus lens 111, the zoom lens 112, the diaphragm 113, and the shutter 114 are driven by corresponding driving devices (not shown) such as a DC motor and a stepping motor according to control signals sent from the controller 150.

The CCD image sensor 120 captures the subject's image formed through the optical system 110 and generates image data. The CCD image sensor 120 generates a new frame of image data at a predetermined frame rate. An image data generating timing and an electronic shutter operation of the CCD image sensor 120 are controlled by the controller 150. With the image data successively displayed on the liquid crystal display 170 as the through image, the user can confirm the subject's state on the liquid crystal display 170 in real time. The CCD image sensor 120 can capture the subject's image in a range narrower than an area for generating the through image with the normal angle of view, and generate, with the same procedure as described above, a through image with the enlarged angle of view of the image area inside the focus frame. Also, the CCD image sensor 120 can change the number of lines of the image to be output. In the embodiment, another imaging device such as a CMOS image sensor or an NMOS image sensor may be used in place of the CCD image sensor 120.

The AFE 121 performs processing such as correlated double sampling and gain control on the image data generated by the CCD image sensor 120. In the gain control, a gain corresponding to ISO sensitivity is set. The AFE 121 converts analog image data to digital image data. Then, the AFE 121 outputs the image data to the image processor 130.

The image processor 130 performs various types of processing on the image data. The various types of processing include, but not limited to, gamma correction and/or white balance correction, YC conversion process, electronic zoom process, compression process, and expansion process. Some of these types of processing may be omitted. The image processor 130 may be configured by a hardwired electronic circuit or may be configured by a microcomputer or the like that executes a program for performing these types of processing. The image processor 130 may also be made into a single integrated circuit together with the controller 150 and the like.

The liquid crystal display 170 is provided on the back of the digital camera 100. The liquid crystal display 170 displays an image based on the image data processed by the image processor 130. The liquid crystal display 170 displays the images such as a through image and a recorded image. The liquid crystal display 170 displays images which are generated for every certain period of time by the CCD image sensor 120 as the through image in real time. By referencing a through image displayed on the liquid crystal display 170, the user can take a photograph by confirming the composition of the subject. The type of through image which is displayed on the liquid crystal display 170 for the user to confirm the subject's composition while the digital camera 100 is waiting for the user's operation is referred to as a "normal through image". When a predetermined condition is satisfied, the liquid crystal display 170 switches the display to the through image generated by enlarging an image area inside the focus frame of the normal through image (hereinafter, referred to as an "enlarged through image"). The recorded image is an image which is recorded on the memory card 192 and the flash memory 160. According to the user's operation, the liquid crystal display 170 displays an image based on the image data already recorded on the memory card 192 and the flash memory 160. Other than the above, the liquid crystal display 170 can display various setting conditions and the like of the digital camera 100.

The controller 150 controls the operations of the respective components of the digital camera 100. The controller 150 sends control signals to the CCD image sensor 120, the image processor 130 and the like based on a vertical synchronizing signal (VD). The controller 150 is configured by a ROM (not shown) that stores information on, for example, a program, a CPU (not shown) that processes the information on the program, and the like. The ROM stores programs related to AF control and exposure control as well as programs for controlling the operations of the respective components of the digital camera 100. The ROM also stores imaging initial data about the aperture and the shutter speed to capture an image for the first time after the CCD image sensor 120 is activated, data about the target brightness value for obtaining the appropriate exposure, and the like.

The controller 150 causes the liquid crystal display 170 to display a menu. The user can perform various kinds of setting by operating the operation section 180 while viewing the menu. When the user operates the operation section 180, the controller 150 obtains the user's setting.

The controller 150 may be configured by a hardwired electronic circuit, or may be configured by a microcomputer or the like. The controller 150 may also be made into a single integrated circuit together with the image processor 130 and the like. The ROM need not be provided inside the controller 150 and may be provided outside the controller 150.

The buffer memory 140 is a storing device that functions as a work memory for the image processor 130 and the controller 150. The buffer memory 140 can be implemented by a DRAM (Dynamic Random Access Memory) or the like.

The flash memory 160 functions as an internal memory for storing image data and the like. The controller 150 stores the image data to be processed in the image processor 130 on the flash memory 160 or the memory card 192.

The card slot 191 is a connecting device for connecting the memory card 192 which is mountable to or removable from the card slot 191. The card slot 191 can electrically and mechanically connect the memory card 192. The card slot 191 may have a function of controlling the memory card 192.

The memory card 192 is an external memory which includes therein a storage unit such as a flash memory. The memory card 192 is capable of storing data such as the image data processed by the image processor 130. Although the memory card 192 is shown as an example of the external memory in the present embodiment, the external memory may be a storage medium such as an optical disk, an HDD, or the like. The digital camera 100 may be adapted to connect a (wired or wireless) communication interface with an external device to the controller 150 and to transmit the image data to the external device.

Figure 2:
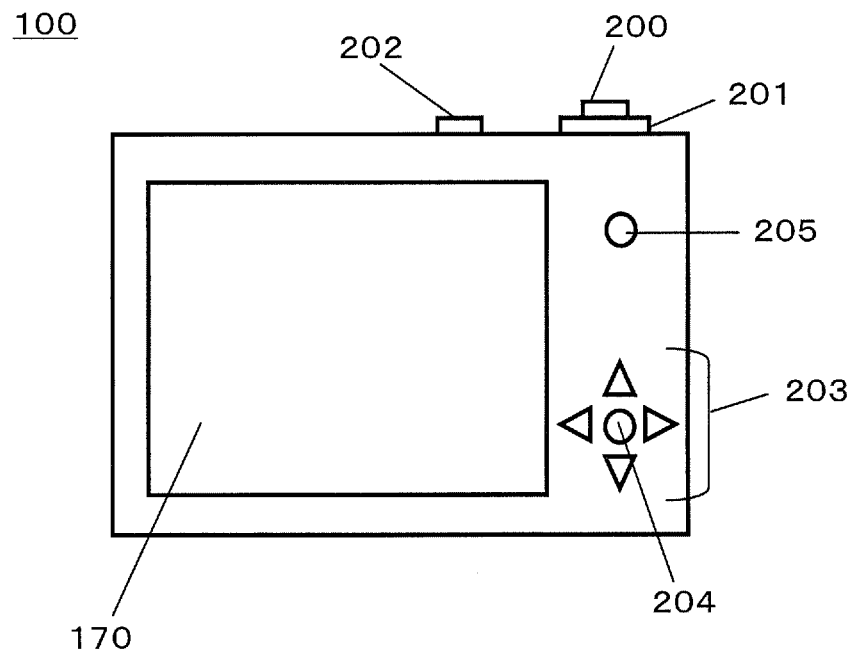
FIG. 2 is a rear view of a structure of the digital camera.

The operation section 180 of the digital camera 100 will be described with reference to FIG. 2. The operation section 180 is a collective name of a button, a lever, a dial, and the like provided outside the digital camera 100, and receives user's operations. For example, as shown in FIG. 2, a release button 200, a zoom lever 201, selection buttons 203, a set button 204, a power supply button 202, an AF start button 205, and the like are included in the operation section 180. When the operation section 180 receives a user's operation, it sends various operation instructing signals to the controller 150.

The release button 200 is a two-step push button. In response to the user's half-press operation on the release button 200, the controller 150 performs the AF control, the automatic exposure control, and the like. When the user performs a full-press operation on the release button 200, the controller 150 records the image data captured at the timing of the full-press operation onto the memory card 192 or the like as a recorded image.

The zoom lever 201 automatically returns to its neutral position between a wide-angle end and a telephoto end for adjusting the angle of view. When the zoom lever 201 is operated by the user, it sends an operation instructing signal to the controller 150 to drive the zoom lens 112.

The power supply button 202 is a push button for switching ON/OFF the power supply for the respective components of the digital camera 100. When the power supply button 202 is pressed by the user in the power OFF state, the controller 150 supplies power to the respective components of the digital camera 100 to activate the components. When the power supply button 202 is pressed by the user in the power ON state, the controller 150 stops the supply of power to the respective components.

The selection buttons 203 are push buttons arranged in the upward/downward/leftward/rightward directions. By pressing one of the selection buttons 203 to indicate the direction, the user can select one of the various conditional items displayed on the liquid crystal display 170.

The set button 204 is a push button. When the set button 204 is pressed by the user while the digital camera 100 is in a recording mode or a playback mode, the controller 150 displays a menu screen on the liquid crystal display 170. The "recording mode" is a mode for recording the image data captured and generated by the CCD image sensor 120 on the memory card 192 or the like. The "playback mode" is a mode for displaying the image data recorded on the memory card 192 or the like on the liquid crystal display 170. The menu screen is provided for the user to set various conditions for the photographing operation/reproducing operation. When the various conditional setting items are selected and the set button 204 is pressed, the controller 150 confirms the settings of the selected items.

The AF start button 205 is a push button. When the AF start button 205 is pressed by the user while the digital camera 100 is in the recording mode, the controller 150 reads a program related to the AF control out from the ROM and starts the AF operation.

The CCD image sensor 120 is an example of an imaging unit. The release button 200 and the AF start button 205 are examples of an operation section. The controller 150 is an example of a controller. The liquid crystal display 170 is an example of a display unit. The digital camera 100 is an example of an imaging apparatus.

1-2. Operation

The operation of the digital camera 100 will be described. The AF operation of the digital camera 100 will be summarized below. While waiting for the user's operation, the digital camera 100 displays a normal through image on the liquid crystal display 170. When the release button 200 is half-pressed or the AF start button 205 is pressed by the user, the digital camera 100 switches the display on the liquid crystal display 170 from the normal through image to an enlarged through image and starts the AF operation. After completion of the AF operation, the digital camera 100 keeps displaying the enlarged through image for a predetermined period of time and then switches the image to an normal through image.

1-2-1. Autofocus Control Operation

The AF control operation of the digital camera 100 will be described below.

The digital camera 100 of the present embodiment performs a single AF control operation as an AF control operation.

The single AF control is performed based on a contrast value which is calculated each time the image data is generated by the CCD image sensor (contrast AZ. The contrast value is obtained by accumulating high-frequency components of the brightness signals in the image data that are set to the AF frame (focus frame). The controller 150 determines a direction to move the focus lens 111 by comparing the contrast values successively obtained by driving the focus lens 111, and detects the focus position for the subject's image.

Figure 3:
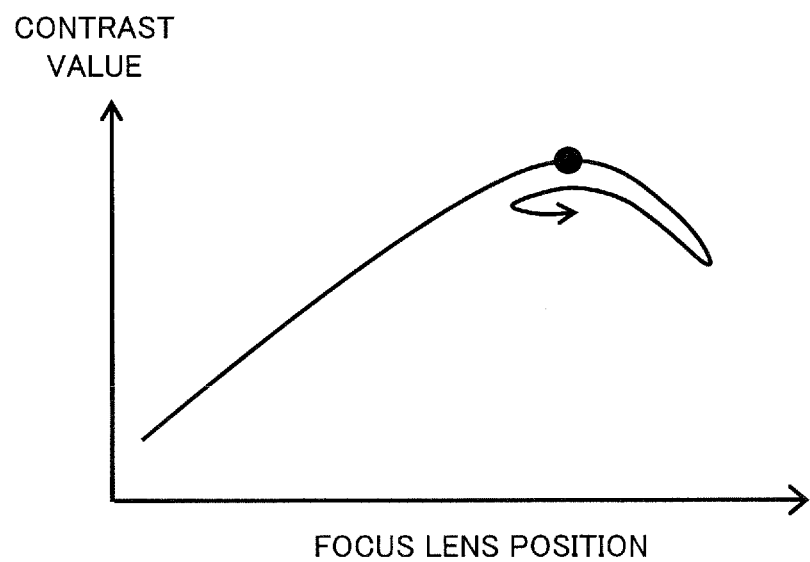
FIG. 3 is a diagram for explaining an autofocus control operation.

The single AF control operation will be described with reference to FIG. 3. A focus motor (not shown) for driving the focus lens 111 keeps driving the focus lens 111 in a direction from the infinity side or the near side. The controller 150 periodically keeps calculating the contrast value along with the driving of the focus lens 111 (AF detection). The focus motor keeps driving the focus lens 111 in one direction as far as the obtained contrast value increases. When the contrast value stops increasing and starts decreasing, the controller 150 determines that the focus lens 111 has passed the focus position. At this time, the controller 150 detects the position of the focus lens 111 where the contrast value peaks as the focus position. Subsequently, the focus motor drives the focus lens 111 in the reverse direction to move beyond the focus position, then further reverses the moving direction to correct a backlash of the focus motor, and starts to move the focus lens 111 to the focus position again. Here, thinning of the image data will be described.

The digital camera 100 of the present embodiment is capable of reducing the number of lines of the image data generated by the CCD image sensor 120. This operation is called "thinning". The image data that has not been thinned out is at the thinning rate of 0%. When the image data whose number of lines that can be captured by the CCD image sensor 120 is thinned out by half, it is at the thinning rate of 50%. Similarly, when the image data whose number of lines that can be captured by the CCD image sensor 120 is thinned out by three quarters, it is at the thinning rate of 75%. As the number of lines of the original image data used for obtaining the contrast value increases, the accuracy of the contrast AF improves. In other words, as the thinning rate of the original image data used for obtaining the contrast value decreases, the accuracy of the AF control improves. That is, as the thinning rate approaches 0%, the AF accuracy improves.

In order to thin out the image data generated by the CCD image sensor 120, the present embodiment adopts pixel mixing reading in which pixels from a plurality of lines of the image data are mixed and read out as pixels from one line. The reading mode includes the mode of reading the image data at the thinning rate of 0%. As the thinning out method, information from the lines at predetermined intervals in the image data may be read out instead of mixing and reading the information from a plurality of lines.

The CCD image sensor 120 of the present embodiment is capable of reading data in a plurality of reading modes. The thinning rate of the image data generated by the CCD image sensor 120 can be changed, as required, by changing the reading mode. Particularly, in the AF operation, the reading mode of the CCD image sensor 120 is set to the reading mode at a low thinning rate. As a result, high definition image data at a low thinning rate can be obtained from the CCD image sensor 120, improving the accuracy of the contrast AF.

1-2-2. Through Image Display Control in AF Operation

The control operation of the through image display of the digital camera 100 will be described with reference to FIG. 4 and FIGS. 5A and 5B.

When the power of the digital camera 100 is turned ON, the controller 150 supplies power to the respective components and executes activation programs for the components. The controller 150 determines whether the digital camera 100 is set to the playback mode or the recording mode (S300). If the playback mode is set (No in S300), the controller 150 performs a control to display an image recorded on the memory card 192 on the liquid crystal display 170. On the other hand, when the recording mode is set (Yes in S300), the controller 150 performs a control to display a normal through image (S301). Specifically, the controller 150 extracts the brightness information from the image data generated by the CCD image sensor 120 and controls the diaphragm 113, the shutter 114, and the image processor 130 to provide the appropriate exposure. When the generated image data is adjusted to achieve the appropriate exposure, the controller 150 sends a control signal to the liquid crystal display 170 to start displaying the through image. Accordingly, the liquid crystal display 170 starts displaying the normal through image as shown in FIG. 5A (S301).

Next, the controller 150 determines whether a focus operation is issued or not (S302). When the controller 150 receives the half-press operation on the release button 200 or the press operation on the AF start button 205 by the user, the controller 150 determines that the focus operation instruction is issued (Yes in S302) and switches the through image displayed on the liquid crystal display 170 to the enlarged through image as shown in FIG. 5B. That is, the controller 150 causes the liquid crystal display 170 to display the enlarged through image (S303). In the description below, it is assumed that the half-press operation on the release button 200 or the press operation on the AF start button 205 is kept until the user performs the full-press operation on the release button 200. The controller 150 of the present embodiment makes the thinning rate of the image data generated by the CCD image sensor 120 in displaying the enlarged through image lower than the thinning rate in displaying the normal through image during the AF operation, by switching the reading mode of the CCD image sensor 120. As a result, the controller 150 can perform more accurate contrast AF during the AF operation by calculating the contrast value based on the high definition image data. Subsequently, the controller 150 starts the AF operation (focus operation) based on the contrast value of the image data read out from the CCD image sensor 120 in the above described manner (S304).

In the above described example, the thinning rate of the image data from the CCD image sensor 120 in displaying the normal through image is brought higher than the thinning rate of the image data in displaying the enlarged through image. When the normal through image is displayed, since the user merely needs to confirm the angle of view, high-speed reading is achieved by increasing the thinning rate of the image data to secure the real time display of the image. Note that the thinning rate (the number of lines) of the image data from the CCD image sensor 120 may be the same when displaying the normal through image and when displaying the enlarged through image.

The controller 150 confirms that the focus lens 111 has moved to the position where the contrast value peaks, and then finishes the AF operation (S305). For a predetermined period of time (2 seconds in this example) after the end of the AF operation, the controller 150 keeps displaying the enlarged through image on the liquid crystal display 170 (No in S306).

When the controller 150 detects that the predetermined period of time (e.g., 2 seconds) elapses after the end of the AF operation (Yes in S306), it controls respective components to switch the display on the liquid crystal display 170 from the enlarged through image to the normal through image (S307). That is, when the controller 150 detects the elapse of the predetermined period of time (2 seconds) while the user is half-pressing the release button 200 or pressing the AF start button 205, the controller 150 switches the display from the enlarged through image to the normal through image. The user can confirm the entire composition of the final image by viewing the normal through image, and subsequently, a recording operation start instruction can be issued by performing full-press operation on the release button 200.

When the recording operation start instruction is issued, the controller 150 controls the CCD image sensor 120 to perform the exposure operation and records the generated image data in the memory card 192.

The user can issue the recording operation start instruction also by full-pressing the release button 200 while the enlarged through image is displayed on the liquid crystal display 170. If the user finishes (cancels) the half-press operation on the release button 200 without proceeding to the full-press operation on the release button 200 while the enlarged through image is displayed on the liquid crystal display 170, the controller 150 may perform a control to switch the display on the liquid crystal display 170 from the enlarged through image to the normal through image even before the predetermined period of time (e.g., 2 seconds) elapses.

Although the predetermined period of time from the end of the AF operation until the display switches to the normal through image is assumed, for illustrative purposes, to be 2 seconds in the present embodiment, the embodiment is not limited thereto. That is, the display of the enlarged through image may be kept to allow the user to secure enough time for confirming the focus state after the end of the AF operation. The predetermined period of time may be, for example, 1 to 5 seconds. Alternatively, the period of time may be previously set by the user.

1-3. Summary of First Embodiment

As described above, the digital camera 100 of the present embodiment has the CCD image sensor 120 for capturing an image of a subject and outputting image information, the release button 200 or the AF start button 205 for receiving a user's instruction to perform a focus operation, the liquid crystal display 170 for displaying an image based on the image information output from the CCD image sensor 120, and the controller 150 for controlling a display operation of the liquid crystal display 170. When the release button 200 or the AF start button 205 receives the instruction to perform the focus operation while the liquid crystal display 170 is displaying a normal through image, the controller 150 controls the liquid crystal display 170 to switch the display on the liquid crystal display 170 from the normal through image to an enlarged through image obtained by enlarging an image area inside the focus frame of the normal through image. When a predetermined period of time (e.g., 2 seconds) elapses after completion of the focus operation, the controller 150 controls the liquid crystal display 170 to switch the display on the liquid crystal display 170 from the enlarged through image to the normal through image.

The digital camera 100 of the present embodiment having the above-described configuration first switches the display on the liquid crystal display 170 from the normal through image to the enlarged through image, upon receipt of the instruction to perform the focus operation. When the predetermined period of time (e.g., 2 seconds) elapses after the completion of the focus operation, the digital camera 100 switches the display on the liquid crystal display 170 from the enlarged through image to the normal through image (the through image with the same angle of view as that of the through image displayed before the start of the focus operation). With the above operations, the user can confirm both the focus state and the angle of view of the image to be photographed, thus improving convenience of the imaging apparatus.

In the digital camera 100 of the present embodiment, the controller 150 controls the focus lens 111 while the CCD image sensor 120 is outputting the enlarged image (enlarged through image) of the subject to be in focus. Therefore, the controller 150 can perform the focus operation by driving the focus lens 111 based on the high quality image data from which the enlarged through image is generated.

In the digital camera 100 of the present embodiment, the controller 150 controls the CCD image sensor 120 to switch output of the enlarged image (the enlarged through image) to output of an image for confirming the angle of view (the normal through image), while the instruction to perform the focus operation (the half-press operation on the release button 200 or the press operation on the AF start button) is being issued. That is, the controller 150 controls the CCD image sensor 120 to switch the output of the enlarged image to the output of the image for confirming the angle of view, after the instruction for the focus operation is issued and before the instruction for the recording operation (the full-press operation on the release button 200) is subsequently issued. Therefore, along the flow from the instruction for the focus operation to the instruction for the recording operation, the digital camera 100 can control the liquid crystal display 170 to display an image suitable for the user's confirmation (the enlarged image or the image for confirming the angle of view).

The digital camera 100 of the present embodiment makes the thinning rate of the enlarged image of the subject to be in focus output from the CCD image sensor 120 lower than the thinning rate of the image for confirming the angle of view by switching the reading mode of the CCD image sensor 120. Accordingly, the digital camera 100 can perform more accurate contrast AF.

In the digital camera 100 of the present embodiment, the predetermined condition to be satisfied after the completion of the focus operation is a condition as to whether the predetermined period of time elapses or not. According to such a condition, the digital camera 100 can keep displaying the enlarged through image based on the enlarged image at a lower thinning rate on the liquid crystal display 170 after the completion of the focus operation until the predetermined period of time elapses. Therefore, the user can easily confirm the focus state of the subject to be in focus.

Second Embodiment

The first embodiment has been described above. However, the embodiment is not limited thereto. A second embodiment will be described below.

In the first embodiment, the predetermined condition for the controller 150 to switch the display on the liquid crystal display 170 from the enlarged through image to the normal through image after the completion of the AF operation is the elapse of a predetermined period of time (e.g., 2 seconds) after the completion of the AF operation. On the other hand, in the present embodiment, the condition for switching the through image is reception of a predetermined operation. The configuration and the operation of the digital camera of the second embodiment will be described below.

2-1. Configuration

The configuration of the digital camera 100 of the present embodiment is the same as that of the first embodiment, and thus the description thereof will be omitted. The same components as those of the first embodiment are denoted by the same reference signs.

2-2. Operation

When the release button 200 is half-pressed or the AF start button 205 is pressed, the digital camera 100 of the present embodiment switches the display on the liquid crystal display 170 from the normal through image to the enlarged through image, starting the AF operation. The digital camera 100 keeps displaying the enlarged through image even after the completion of the AF operation. When the set button 204 is pressed, the display on the liquid crystal display 170 is switched to the normal through image. The operation of the digital camera 100 of the present embodiment will be described below in detail.

2-2-1. Autofocus Control Operation

The control operation of the through image display in the AF mode of the digital camera 100 will be described with reference to FIG. 6.

Figure 4:
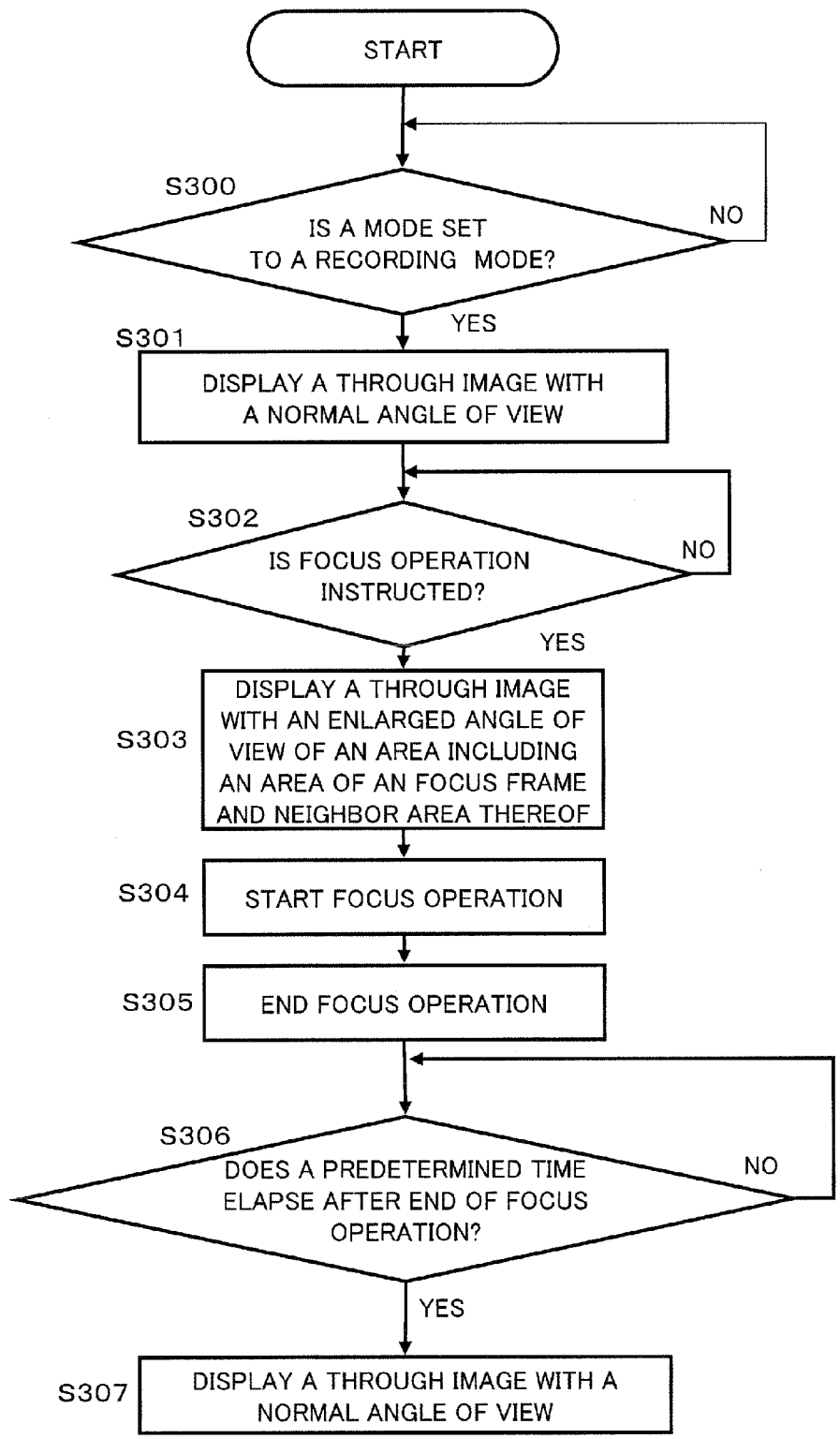
FIG. 4 is a flow chart for explaining operations of a first embodiment.
Figure 5A:
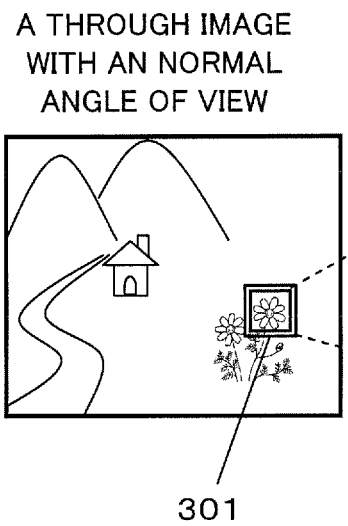
FIGS. 5A and 5B are diagrams for explaining switching of through image display in AF operation.
Figure 5B:
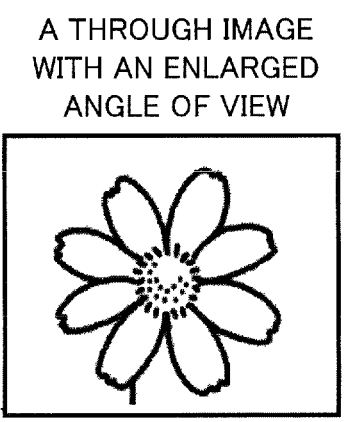
Figure 6:
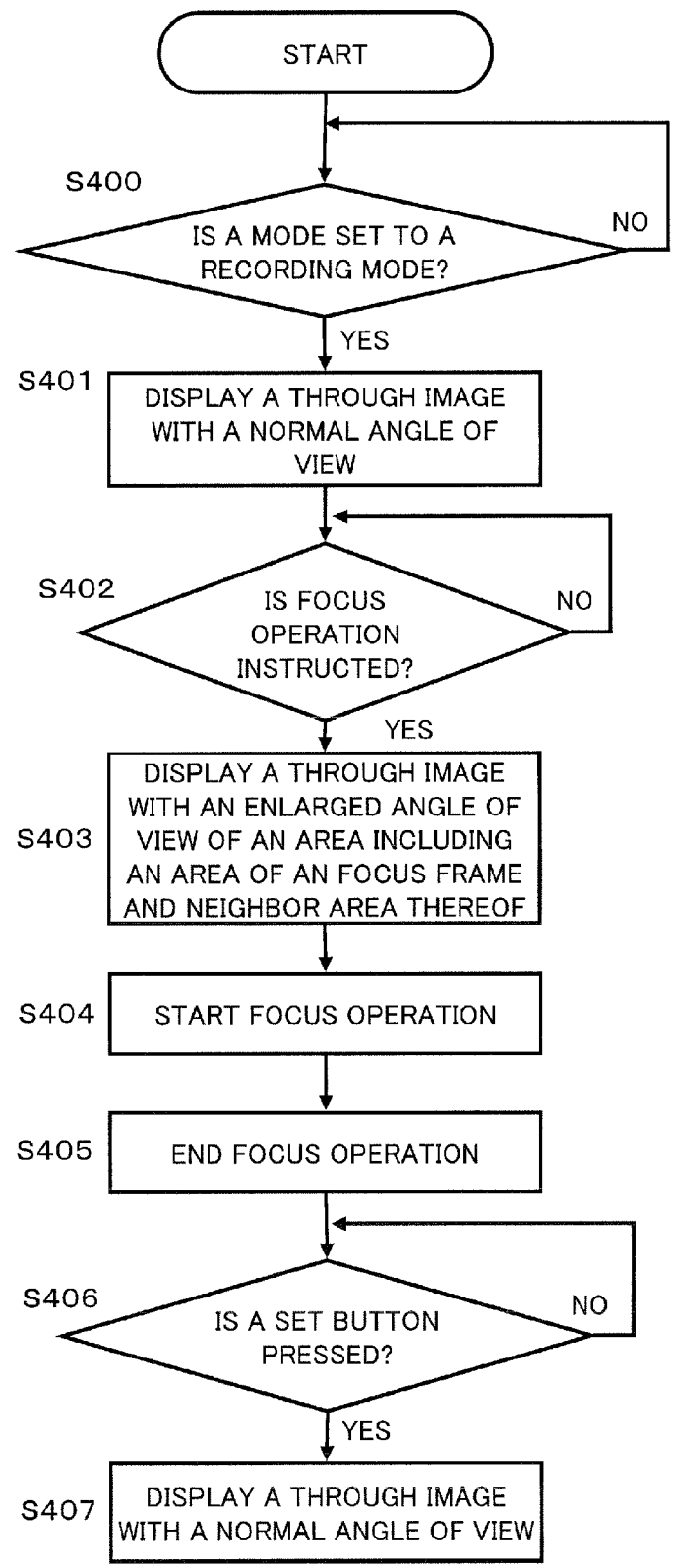
FIG. 6 is a flow chart for explaining an operation of a second embodiment.

Since the operation corresponding to steps S400 to S405 in FIG. 6 are the same as that corresponding to steps S300 to S305 in FIG. 4, the description thereof will be omitted.

After the end of the AF operation, the controller 150 monitors whether the set button 204 is pressed by the user while the enlarged through image is displayed on the liquid crystal display 170 (S406). When the controller 150 detects that the set button 204 is pressed (Yes in S406), it switches the reading mode of the CCD image sensor 120 and switches the display from the enlarged through image to the normal through image (S407). After the display is switched to the normal through image, the user can issue the recording operation start instruction by performing the full-press operation on the release button 200.

When the controller 150 receives the recording operation start instruction, it controls the CCD image sensor 120 to perform the exposure operation and records the image data generated by the CCD image sensor 120 in the memory card 192.

Although the case where the set button 204 is used as a button for switching the display from the enlarged through image to the normal through image in the present embodiment, it is not limited thereto. For example, a similar function may be assigned to the zoom lever 201, the selection buttons 203 or any other user input.

In the present embodiment, the display on the liquid crystal display 170 may be switched to the normal through image, if the user finishes (cancels) the half-press operation on the release button 200 without proceeding to the full-press operation while the enlarged through image is displayed on the liquid crystal display 170.

2-3. Summary of Second Embodiment

As described above, the digital camera 100 of the present embodiment includes the CCD image sensor 120 for capturing an image of a subject and outputting image information, the release button 200 or the AF start button 205 for receiving a user's instruction to perform the focus operation, the liquid crystal display 170 for displaying an image based on the image information output from the CCD image sensor 120, and the controller 150 for controlling the display operation of the liquid crystal display 170. When the release button 200 or the AF start button 205 receives the instruction to perform the focus operation while the liquid crystal display 170 is displaying a normal through image, the controller 150 controls the liquid crystal display 170 to switch the display on the liquid crystal display 170 from the normal through image to an enlarged through image which is obtained by enlarging an image area inside the focus frame 301 of the normal through image. After the completion of the focus operation, when the release button 200 or the AF start button 205 receives the instruction to perform the focus operation, the controller 150 controls the liquid crystal display 170 to switch the display on the liquid crystal display 170 from the enlarged through image to the normal through image.

The digital camera 100 of the present embodiment having the above described configuration first switches the display on the liquid crystal display 170 from the normal through image to the enlarged through image, upon receipt of the instruction to perform the focus operation. When the release button 200 or the AF start button 205 receives the instruction to perform the focus operation after the completion of the focus operation, the digital camera 100 switches the display on the liquid crystal display 170 from the enlarged through image to the normal through image (the through image with the same angle of view as that of the through image displayed before the start of the focus operation). With this configuration, the user can switch the through image at any timing intended by the user, so that the user can confirm both the focus state and the angle of view of the image to be photographed similarly to the first embodiment, thus improving the convenience of the imaging apparatus.

3. Other Embodiments

The first and second embodiments have been described above. The other embodiments will also be described below.

The digital camera 100 of the first embodiment is adapted to switch the display from the enlarged through image to the normal through image when the predetermined period of time elapses after the end of the AF operation. However, if the user presses the set button 204 in the predetermined period of time as in the second embodiment, the digital camera 100 of the first embodiment may also be adapted to switch the display on the liquid crystal display 170 to the normal through image before the predetermined period of time elapses.

In the first embodiment and the second embodiment, when the release button 200 is half-pressed or the AF start button 205 is pressed by the user, the digital camera 100 switches the display on the liquid crystal display 170 from the normal through image to the enlarged through image and starts the AF operation. However, the digital camera 100 may be adapted only to start the AF operation without switching the display to the enlarged through image when the AF start button 205 is pressed. In this case, the digital camera 100 may also be adapted to switch the display from the normal through image to the enlarged through image in response to the half-press operation on the release button 200.

Moreover, the digital camera 100 of the above-described embodiments may be adapted to switch the display on the liquid crystal display 170 from the enlarged through image to the normal through image, if the characteristics of the original image data of the enlarged through image (the image in the focus frame 301) change more than a predetermined value while the enlarged through image is displayed in the AF operation. The characteristics of the image data may be, for example, the characteristics regarding the brightness. The digital camera 100 of the above described embodiments may also be adapted to switch the display on the liquid crystal display 170 from the enlarged through image to the normal through image, when the original image data of the enlarged through image includes a face and when face information about the face is no longer included in the enlarged through image.

The digital camera 100 of the above-described embodiments reduces the thinning rate of the image data to be used for calculating the contrast value to improve the accuracy of the contrast AF. However, the embodiment is not limited thereto. The accuracy of the contrast AF may be improved by increasing the frame rate of the image data output from the CCD image sensor 120 to increase the frequency of calculating the contrast value.

As described above, the digital camera 100 can display the enlarged through image for confirming the focus state during the AF operation and for a certain period of time after the AF operation, then switch the display to the normal through image for confirming the angle of view at a predetermined timing, and start the recording operation. Accordingly, a convenient imaging apparatus can be realized which is easy for the user to confirm the focus state of the subject to be in focus.

INDUSTRIAL APPLICABILITY

The aforementioned embodiments can be applied to imaging apparatuses with an AF control function including a digital camera, a video camera, and a camera-equipped information terminal.

What is claimed is:

1. An imaging apparatus comprising:
   an imaging unit configured to capture an image of a subject to output image information;
   an operation section configured to receive a user's instruction to perform a focus operation;
   a display unit configured to display an image based on the image information output from the imaging unit; and
   a controller configured to control a display operation of the display unit, wherein:
   when the operation section receives the user's instruction to perform the focus operation while the display unit is displaying the image, the controller controls the display unit to switch a display on the display unit from the image currently being displayed to an enlarged image of a focus area in the image currently being displayed, and
   when a predetermined period of time has elapsed after completion of the focus operation and before receiving a user's instruction for starting recording while the operation section continuously receives the user's instruction to perform the focus operation, the controller further controls the display unit to switch the display on the display unit from the enlarged image to an image with a same angle of view as that of the image which was displayed before the enlarged image.

2. The imaging apparatus according to claim 1, wherein the controller performs the focus operation while the display unit is displaying the enlarged image.

3. The imaging apparatus according to claim 1, wherein original image information of the enlarged image is at a higher definition than original image information of the image currently being displayed.

* * * * *